United States Patent [19]
Mori et al.

[11] Patent Number: 5,811,492
[45] Date of Patent: Sep. 22, 1998

[54] POLYPHENYLENE SULFIDE RESIN COMPOSITIONS

[75] Inventors: Katsuaki Mori; Akeharu Tsuruta, both of Yokkaichi, Japan

[73] Assignee: General Electric Company, Pittsfield, Mass.

[21] Appl. No.: 953,316

[22] Filed: Sep. 28, 1992

Related U.S. Application Data

[63] Continuation of Ser. No. 629,875, Dec. 19, 1990, abandoned.

[30] Foreign Application Priority Data

Feb. 13, 1990 [JP] Japan .......................... 2-29659

[51] Int. Cl.$^6$ .......................... C08L 283/00; C08L 81/00
[52] U.S. Cl. .............................. 525/92; 525/537
[58] Field of Search ........................ 525/92, 637

[56] References Cited

U.S. PATENT DOCUMENTS

| | | | |
|---|---|---|---|
| 4,514,588 | 4/1985 | Beever et al. | 524/505 |
| 4,605,732 | 8/1986 | Heitz et al. | 528/388 |
| 4,972,020 | 11/1990 | Shiraki et al. | 525/74 |
| 5,015,704 | 5/1991 | Takekoshi et al. | 525/537 |
| 5,086,129 | 2/1992 | Kohler et al. | 528/588 |

FOREIGN PATENT DOCUMENTS

| | | |
|---|---|---|
| 53-69255 | 6/1978 | Japan . |
| 63-56559 | 3/1988 | Japan . |

*Primary Examiner*—Helen L. Pezzuto

[57] ABSTRACT

The present invention concerns polyphenylene sulfide resin compositions having excellent heat resistance, fire resistance, chemical resistance, impact resistance, mechanical strength, and moldability.

17 Claims, No Drawings

POLYPHENYLENE SULFIDE RESIN COMPOSITIONS

This is a continuation of application Ser. No. 07/629,875 filed on Dec. 19, 1990, now abandoned.

Improved polyphenylene sulfide compositions are described, comprising (a) amino group-containing polyphenylene sulfide, (b) a hydrogenated block copolymer containing at least one vinyl aromatic compound polymer block and at least one hydrogenated conjugated diene compound polymer block, and (c) polyamide at (a):(b)=99–50:1–50 (wt %) and (a)+(b):(c)=100:1–63 (parts by weight).

DETAILED EXPLANATION OF THE INVENTION

Industrial application field

The present invention concerns polyphenylene sulfide resin compositions having excellent heat resistance, fire resistance (i.e., flame retardance), chemical resistance, impact resistance, mechanical strength, and moldability.

Conventional technology

Polyphenylene sulfides are known as high-performance engineering plastics having excellent heat resistance, chemical resistance, and fire resistance. However, polyphenylene sulfides have an important drawback, that is poor impact strength. To overcome such a drawback, numerous proposals have been made including blending with various resins and elastomers or alloying. For example, in Japanese Kokai Patents Nos. Sho 53[1978]-69255 and Hei 1[1989]-174562, there are described resin compositions based on polyamides and polyphenylene sulfides, having excellent impact resistance and mechanical strength. Also, in Japanese Kokai Patents Nos. Sho 59[1984]-167040, Sho 58[1983]-27740 and Sho 61[1986]-161057 are proposed resin compositions from polyphenylene sulfide and styrene-hydrogenated conjugated diene block copolymer or its acid-modified products, glycidyl methacrylate-modified products, etc., having excellent impact resistance. In Japanese Kokai Patent No. Hei 1[1989]-21359, resin compositions having excellent heat resistance, impact resistance, and solvent resistance are described, based on amorphous thermoplastic resins of glass transition point above 120° C. and glycidyl group-containing thermoplastic polymers. Also, in Japanese Kokai Patent No. Sho 63[1988]-56559 are proposed polyamide resin compositions from polyphenylene sulfide and nylon 46 and modified rubbery polymers, having excellent impact resistance, chemical resistance, and heat resistance.

Problems to be solved by the invention

However, among these proposals, those in Japanese Kokai Patents Nos. Sho 53[1978]-69255 and Hei 1[1989]-174562 did not reach sufficient impact strength, due to unsatisfactory compatibility of both resins, and in Japanese Kokai Patents Nos. Sho 58[1983]-27740, Sho 59[1984]-167040, and Sho 61[1986]-161057, the heat resistance, a strong point for polyphenylene sulfide is sacrificed, thus resin compositions having a good balance of heat resistance and impact resistance are not obtained. In Japanese Kokai Patent No. Sho 63[1988]-56559, the resin compositions are mainly based on nylon 46, and no improvement concerning polyphenylene sulfide is obtained.

Means for solving the problems

Under such circumstances, as a result of an intensive investigation of ways to solve such problems of conventional polyphenylene sulfide, it has been discovered that this problem can be overcome by introducing amino groups into polyphenylene sulfide for improved affinity for polyamides. Thus, polyphenylene sulfide resin compositions of high practical utility with excellent moldability and impact resistance, while heat resistance is retained, are provided.

The present invention provides a polyphenylene sulfide composition, comprising (a) amino group-containing polyphenylene sulfide, (b) hydrogenated block copolymer containing at least one vinyl aromatic compound polymer block and at least one hydrogenated conjugated diene compound polymer block, and (c) polyamide at (a):(b)=99–50:1–50 (wt %) and (a)+(b):(c)=100:1–63 (parts by weight).

There are no particular restrictions on the amino group-containing polyphenylene sulfides used as component (a), as far as they are obtained by conventional means, e.g., reaction of halogen-substituted aromatic compounds and alkali metal sulfides (U.S. Pat. No. 2,513,188, Japanese Kokoku Patents Nos. Sho 44[1969]-27671 and Sho 45[1970]-3368), more specifically;

(A) polymerization of alkali metal sulfides and dihalobenzenes in an organic amide solvent in the presence of amino group-containing aromatic halogen compound of the general formula (1),

$$(X)_m Ar(NH_2)_n \qquad (1)$$

in which X represents halogen; Ar represents aromatic hydrocarbon group of 6–18 carbon atoms; m represents an integer of 1–4; n represents an integer of 1–4);

(B) polymerization of alkali metal sulfides and dihalobenzenes in an organic amide solvent in the presence of nitro group-containing aromatic halogen compound of the general formula (2),

$$(NH_2)_x Ar(NO_2)_y \qquad (2)$$

in which Ar represents an aromatic hydrocarbon group of 6–18 carbon atoms; x represents an integer of 0–4; y represents an integer of 1–4; when x is 0, y represents an integer of 2–4 (in this case, the nitro group is reduced to an amino group).

The amino group-containing aromatic halogen compounds represented by the general formula (1) are, e.g., m-fluoroaniline, o-chloroaniline, m-chloroaniline, p-chloroaniline, 2,3-dichloroaniline, 2,4-dichloroaniline, 2,5-dichloroaniline, 2,6-dichloroaniline, 3,4-dichloroaniline, 3,5-dichloroaniline, 2-amino-4-chlorotoluene, 2-amino-6-chlorotoluene, 4-amino-2-chlorotoluene, 3-chloro-m-phenylenediamine, m-bromoaniline, 3,5-dibromoanilne, m-iodoaniline, 4-chloro-1,2-phenylenediamine, 5-chloro-1,3-phenylenediamine, and mixtures thereof, while preferred are 5-chloro-1,3-phenylenediamine, p-chloroaniline, and 3,5-dichloroaniline.

The aromatic nitro compounds represented by the general formula (2) are, e.g., o-dinitrobenzene, m-dinitrobenzene, p-dinitrobenzene, 1,2,3-trinitrobenzene, 1,2,4-trinitrobenzene, 1,3,5-trinitrobenzene, 1,2,3,5-tetranitrobenzene, 1,2,4,5-tetranitrobenzene, o-nitroaniline, m-nitroaniline, p-nitroaniline, 3-nitro-2-aminotoluene, 4-nitro-2-aminotoluene, 5-nitro-2-aminotoluene, 6-nitro-2-aminotoluene, 4-nitro-3-aminotoluene, 6-nitro-3-aminotoluene, 2-nitro-4-aminotoluene, 3-nitro-4-aminotoluene, 2,4-dinitroaniline, 2,5-dinitroaniline, 2,6-dinitroaniline, 3,5-dinitroaniline, 2,4,6-trinitroaniline, 3-nitro-o-phenylenediamine, 4-nitro-o-phenylenediamine, 4-nitro-m-phenylenediamine, 2-nitro-p-phenylenediamine, 4,6-dinitro-o-phenylenediamine, 4,6-dinitro-m- phenylenediamine, 1-amino-2-nitronaphthalene, 1-amino-3-nitronaphthalene, 1-amino-4-nitronaphthalene, 1-amino-5-nitronaphthalene, 1-amino-6-nitronaphthalene, 1-amino-7-nitronaphthalene, 1-amino-8-nitronaphthalene, 2-amino-1-nitronaphthalene, 2-amino-3-nitronaphthalene, 2-amino-4-nitronaphthalene, 2-amino-5-nitronaphthalene, 2-amino-6-nitronaphthalene, 2-amino-7-nitronaphthalene, 2-amino-8-nitronaphthalene, 1-amino-2,4-dinitronaphthalene, 1-amino-4,5-dinitronaphthalene, 1-amino-4,8-dinitronaphthalene, 2-amino-1,5-dinitronaphthalene, 2-amino-1,6-dinitronaphthalene, 2-amino-1,8-dinitronaphthalene, 2-amino-4,5-dinitronaphthalene, 9,10-dinitroanthracene, and mixtures thereof.

Such amino group-containing aromatic halogen compounds and aromatic nitro compounds may be added together with dihalobenzenes or after the polymerization of alkali metal sulfides and dihalobenzenes is initiated.

The alkali metal sulfides used in the above manufacturing process are lithium sulfide, sodium sulfide, potassium sulfide, rubidium sulfide, cesium sulfide, and mixtures thereof, and they can be used in hydrate form without any adverse effects. The preferred alkali metal sulfide is sodium sulfide. Such alkali metal sulfides can be obtained by the reaction of alkali metal hydrosulfides with an alkali metal base or of hydrogen sulfide and an alkali metal base. They may be prepared immediately before addition on site or in advance.

Preferably, before the polymerization with addition of dihalobenzene, the water in the system is removed by distillation, etc., so that the water content to 1 mol of alkali metal sulfide is less than 4 mol; it is possible to alter the water content during the polymerization.

The dihalobenzenes that can be used in the above reaction are p-dichlorobenzene, p-dibromobenzene, p-diiodobenzene, m-dichlorobenzene, m-dibromobenzene, m-diiodbenzene, 1-chloro-4-bromobenzene, etc., while preferred are p-dihalobenzenes, e.g., p-dichlorobenzene, etc. The p-dihalobenzenes may be copolymerized with up to 30 mol % of m-dihalobenzenes such as m-dichlorobenzene, etc., o-dihalobenzenes such as o-dichlorobenzene, etc., or dihalo aromatic compounds such as dichloronaphthalene, dibromonaphthalene, dichlorodiphenyl sulfone, dichlorobenzophenone, dichlorodiphenyl ether, dichlorodiphenyl sulfide, dichlorodiphenyl, dibromodiphenyl, dichlorodiphenyl sulfoxide, etc. It is also possible to copolymerize with polyhalo aromatic compounds having three or more halogen atoms per molecule, e.g., trichlorobenzene, tribromobenzene, triiodobenzene, tetrachlorobenzene, trichloronaphthalene, tetrachloronaphthalene, etc.

The solvents that can be used in the above manufacture are preferably polar solvents, while aprotic organic amides resistant to alkalis at high temperature are especially preferred. Some of the examples of organic amides used in the above manufacture include N,N-dimethylacetamide, N,N-dimethylformamide, hexamethylphosphoramide, N-methyl-ξ-caprolactam, N-ethyl-2-pyrrolidone, N-methyl-2-pyrrolidone, 1,3-dimethylimidazolidinone, dimethyl sulfoxide, sulfolane, tetramethylurea, and mixtures thereof.

The polymerization is done at 200°–300° C., preferably 220°–280° C. for 0.5–30 h, preferably 1–15 h under stirring.

The amino group content in the amino group-containing polyphenylene sulfide is determined by determination of unreacted amino group-containing aromatic halogen compounds and aromatic nitro compounds in the polymerization solvent by gas chromatography.

The amino group content in the amino group-containing polyphenylene sulfide used in the present invention is usually 0.01–20 mol %, preferably 0.05–5 mol %, more preferably 0.1–5 mol %. With the amino group content exceeding 20 mol %, the heat resistance of polyphenylene sulfide decreases markedly, and is thus not preferred. On the other hand, below 0.01 mol %, the effects of the present invention are too small, thus the objects of the present invention can not be achieved.

The amino group-containing polyphenylene sulfides used in the present invention may be linear or branched obtained after heat treatment, or may have both structures.

The melt viscosity (by Koka flow tester with die $\phi=0.5$ mm, L=2 mm, 300° C., load 10 kg) of the amino group-containing polyphenylene sulfides is, before heat treatment in case of branched form, 10–10,000 P, preferably 100–5,000 P, more preferably 400–2,000, or after heat treatment 100–100,000 P, preferably 1,000–500,000 P, more preferably 3,000–30,000 P.

The melt viscosity of the linear form may be 100–100,000 P, preferably 300–50,000 P, more preferably 500–30,000 P.

With melt viscosity exceeding 100,000 P, moldability is poor, while below 100 P, mechanical strength is very low, thus not favored.

The separation of polyphenylene sulfides from the reaction mixtures thus obtained may be done by the conventional manner. For example, the polymer recovered by solvent distillation, flashing, etc., is washed with water, or the reaction mixture is filtered to recover the solvent, and the polymer is washed with water.

The hydrogenated block copolymers used as component (b) in the present invention, having at least one vinyl aromatic compound polymer block and at least one hydrogenated conjugated diene compound polymer block include hydrogenated block copolymers formed by hydrogenation of vinyl aromatic compound-conjugated diene block copolymer (unhydrogenated block copolymer). Here, the unhydrogenated block copolymer comprises at least one vinyl aromatic compound polymer block (A) and at least one conjugated diene compound polymer block (B), having a structure of, e.g., A-B, A-B-A, B-A-B-A, (A-B-)$_4$Si, A-B-A-B-A, etc.

The unhydrogenated block copolymer has a vinyl aromatic compound content of 5–50 wt %, preferably 10–40 wt % based on overall block copolymer.

Next, the block structure is discussed. The vinyl aromatic compound polymer block (A) is a vinyl aromatic compound homopolymer block or a copolymer block of at least 50 wt %, preferably above 70 wt % of vinyl aromatic hydrocarbon compound and conjugated diene compound.

The conjugated diene compound block (B) is a conjugated diene homopolymer block or copolymer block of at least 50 wt %, preferably above 70 wt % of conjugated diene and vinyl aromatic compound.

In such polymer blocks A and B, the conjugated diene compound or vinyl aromatic compound may have random or tapered (the monomer component added to the molecular chain increases or decreases) or partial block distribution or mixtures thereof. When there are two or more each of the vinyl aromatic compound block (A) and conjugated diene compound polymer block (B), the polymer blocks may have the same or different structures.

The vinyl aromatic compounds constituting the block copolymers are, e.g., styrene, p-methylstyrene, vinyltoluene, 4-t-butylstyrene, 1,1-diphenylethylene, etc. They may be used alone or as mixtures thereof. Especially preferred for the vinyl aromatic compound is styrene.

The conjugated diene compounds are, e.g., butadiene, isoprene, 1,3-pentadiene, 2,3-dimethyl-1,3-butadiene, etc.

They may be used alone or as mixtures thereof. Especially preferred for the conjugated diene compounds are butadiene and/or isoprene.

The conjugated diene compound polymer block (B) may have any microstructure.

The unhydrogenated block copolymers have number-average molecular weights of 5,000–1,000,000, preferably 10,000–800,000, more preferably 30,000–500,000, with molecular weight distribution (as weight-average molecular weight ($\overline{Mw}$) to number-average molecular weight ($\overline{Mn}$) ratio ($\overline{Mw}/\overline{Mn}$) preferably below 10.

Any means may be used for the preparation of such unhydrogenated block copolymers. For example, in accordance with the procedures of Japanese Kokoku Patent No. Sho 40[1965]-23798, vinyl aromatic compound-conjugated diene block copolymers are synthesized using a lithium catalyst in an inert solvent.

The hydrogenated block copolymers may be obtained by hydrogenation of the above unhydrogenated block copolymers by the methods described in, e.g., Japanese Kokoku Patents Nos. Sho 42[1967]-8704 and Sho 43[1968]-6636 and Japanese Kokai Patents Nos. Sho 59[1984]-133203 and Sho 60[1985]-79005.

In this case, at least 80% of the aliphatic double bonds in the conjugated diene compounds of the unhydrogenated block copolymers are hydrogenated, so that the polymer block of mainly conjugated diene compound is converted into morphologically olefinic compound polymer block.

However, there are no particular restrictions on the degree of hydrogenation of aromatic double bonds based on the vinyl aromatic compounds copolymerized in the vinyl aromatic compound polymer block (A) and the conjugated diene compound polymer block (B).

The residual content of unhydrogenated aliphatic double bonds in the hydrogenated block copolymers can be easily detected by infrared spectrophotometer, nuclear magnetic resonance, etc.

To obtain reactivity with the amino groups in the polyphenylene sulfide and in the polyamide end groups, carboxyl group and/or carboxy derivative group (hereafter, carboxy group, etc.) and/or epoxy group may be incorporated into the hydrogenated block copolymer component (b).

The carboxy group-containing hydrogenated block copolymers can be prepared by the conventional manner by graft copolymerization of unsaturated carboxylic acid and/or unsaturated carboxylic acid derivatives onto the above hydrogenated block copolymers.

The unsaturated carboxylic acid and/or unsaturated carboxylic acid derivatives used here are, e.g., acrylic acid, methacrylic acid, ethacrylic acid, crotonic acid, itaconic acid, citraconic acid, maleic acid, fumaric acid, butanedicarboxylic acid, their alkyl esters, anhydrides, imides, etc. They may be used alone or as mixtures thereof.

Preferred examples of the unsaturated carboxylic acid and/or unsaturated carboxylic acid derivatives include maleic anhydride, itaconic anhydride, maleic acid, fumaric acid, maleic acid imide, itaconic acid imide, citraconic acid imide, etc., while especially preferred are maleic anhydride, itaconic anhydride, maleic acid imide.

The epoxy group-containing hydrogenated block copolymers are obtained by graft copolymerization of glycidyl group-containing unsaturated compounds onto the above hydrogenated block copolymers, and while the glycidyl group-containing unsaturated compounds that can be used here may be any compound having unsaturated group and glycidyl group in the molecule, examples include the compounds represented by the general formulas (3) and (4),

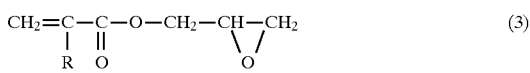

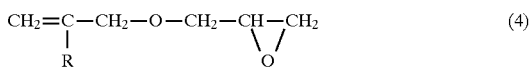

(where R represents hydrogen, lower alkyl group, or glycidyl ester group-substituted lower alkyl group), more specifically, glycidyl acrylate, glycidyl methacrylate, glycidyl ethacrylate, glycidyl itaconate, allyl glycidyl ether, etc.

Other glycidyl group-containing unsaturated compounds are, e.g., diglycidyl maleate, methyl glycidyl maleate, ethyl glycidyl maleate, isopropyl glycidyl maleate, t-butyl glycidyl maleate, diglycidyl fumarate, methyl glycidyl fumarate, isopropyl glycidyl fumarate, diglycidyl itaconate, methyl glycidyl itaconate, isopropyl glycidyl itaconate, diglycidyl 2-methylene glutarate, methyl glycidyl 2-methylene glutarate, etc.

The glycidyl group-containing unsaturated compounds may be used alone or as mixtures thereof.

Preferred are glycidyl acrylate, glycidyl methacrylate, glycidyl ethacrylate, glycidyl itaconate, glycidyl allyl ether, etc., while especially preferred are glycidyl acrylate, glycidyl methacrylate, allyl glycidyl ether.

The carboxy group and/or epoxy group-containing hydrogenated block copolymers can be obtained by graft reaction of the above unsaturated carboxylic acid and/or unsaturated carboxylic acid derivative and/or glycidyl group-containing unsaturated compounds onto the above hydrogenated block copolymers in the presence or absence of organic peroxides. Such a reaction can be carried out in the molten state or in solutions. For example, using a vented extruder, while the hydrogenated block copolymers undergo the graft reaction, the residual unreacted unsaturated carboxylic acid and/or unsaturated carboxylic acid derivative and/or glycidyl group-containing unsaturated compound are removed by forced venting. The hydrogenated block copolymers dissolved or suspended in a solvent are grafted by the unsaturated carboxylic acid and/or unsaturated carboxylic acid derivative and/or glycidyl group-containing unsaturated compound.

The organic peroxide compounds used as needed in such reactions are, e.g., dicumyl peroxide, di-t-butyl peroxide, t-butyl cumyl peroxide, 2,5-dimethyl-2,5-bis(t-butylperoxy)hexane, 2,5-dimethyl-2,5-bis(t-butylperoxy)hex-3-yne, n-butyl 4,4-bis(t-butylperoxy)valerate, 1,1-bis(t-butylperoxy)-3,3,5-trimethylcyclohexane, etc. They may be used alone or as mixtures thereof. The graft reaction may be carried out using radical reaction initiators other than peroxides, such as 2,3-dimethyl-2,3-diphenylbutane, 2,3-diethyl-2,3-diphenylbutane, 2,3-dimethyl-2,3-bis(p-methylphenyl)butane, 2,3-dimethyl-2,3-bis(bromophenyl)butane, etc.

The amount of the above organic peroxide compounds and radical reaction initiators used in such graft reactions is usually 0.01–5 parts by weight to 100 parts by weight of the hydrogenated block copolymers.

The carboxy group, etc., and/or epoxy group-containing hydrogenated block copolymers may be completely freed from the unreacted unsaturated carboxylic acid and/or unsaturated carboxylic acid derivative and/or glycidyl group-containing unsaturated compound, but the removal is not essential.

The amount of the unsaturated carboxylic acid and/or unsaturated carboxylic acid derivative and/or glycidyl group-containing unsaturated compound grafted onto the block copolymers can be easily determined by known methods, more specifically, by instrumental analysis by infrared spectrophotometer, nuclear magnetic resonance, etc., titration analysis, etc. The residual content of the unreacted unsaturated carboxylic acid and/or unsaturated carboxylic acid derivative and/or glycidyl group-containing unsaturated compound can be easily determined by, e.g., gas chromatography, etc.

The amount of the grafted unsaturated carboxylic acid and/or unsaturated carboxylic acid derivative and/or glycidyl group-containing unsaturated compound is usually 0.01–20 wt %, preferably 0.05–10 wt %, more preferably 0.1–5 wt %.

The polyamides used as component (c) in the present invention include polyamides obtained by the ring-opening polymerization of lactams such as ξ-caprolactam, ω-dodecalactam, etc., polyamides derived from amino acids such as 6-aminocaproic acid, 11-aminoundecanoic acid, 12-aminododecanoic acid, etc., polyamides derived from aliphatic, alicyclic and aromatic diamines such as ethylenediamine, tetramethylenediamine, hexamethylenediamine, undecamethylenediamine, dodecamethylene-diamine, 2,2,4-/2,4,4-trimethylhexamethylenediamine, 1,3- and 1,4-bis(aminomethyl)cyclohexane, bis(4,4'-aminocyclohexyl)methane, m- and p-xylylenediamine, etc. and acid derivatives such as aliphatic, alicyclic and aromatic dicarboxylic acids and their halides, e.g., adipic acid, sebacic acid, dodecanedioic acid, 1,3- and 1,4-cyclohexanedicarboxylic acid, isophthalic acid, terephthalic acid, dimer acid, etc., their acid chlorides, etc., copolyamides thereof, and mixed polyamides.

Among them, polycaproamide (nylon 6), polyundecanamide (nylon 11), polydodecanamide (nylon 12), polyhexamethylenadipamide (nylon 66), polytetramethylenadipamide (nylon 46), and their copolyamides are useful, while nylon 66 and nylon 46 are preferred. Nylon 46 is especially preferred.

The polyamides may be prepared by the conventional manner by melt polymerization, solution polymerization, or a combination thereof. While there are no particular restrictions on the degree of polymerization of the polyamides, polyamides of relative viscosity 2.0–5.0 (measured for a solution of 1 g of polymer in 100 mL of 98% concentrated sulfuric acid, at 25° C.) are used depending on needs.

The resin compositions from the above components used in the present invention contain 100 parts by weight of resin composition comprising 99–50 wt %, preferably 90–50 wt % of component (a) and 1–50 wt %, preferably 10–50 wt % of component (b), and 1–63 wt %, preferably 5–60 wt %, more preferably 5–55 wt % of component (c).

With component (a) below 50 wt %, resin compositions excellent in both heat resistance and workability are not obtained; thus, this is not favored. With component (c) below 1 part by weight based on 100 parts by weight of components (a)+(b), heat resistance is low, while above 63 parts by weight, fire resistance is poor. Thus, this is not favored.

As shown above, the polyphenylene sulfide compositions of the present invention comprise components (a), (b) and (c), while within the scope of the present invention, thermoplastic elastomers can be added, e.g., ethylene-propylene-ethylidenenorbornene copolymer (EPDM rubber), ethylene-propylene copolymer (EP rubber), ethylene-1-butene copolymer, styrene block copolymer elastomers such as styrene-butadiene copolymer, styrene-isoprene block copolymer, etc., amide elastomers, ester elastomers, urethane elastomers, etc., and rubbery polymers, e.g., conjugated diene rubbers, acrylic rubbers, etc. Other polymers that can also be added include thermoplastic resins and thermosetting resins, such as polyethylene, polystyrene, polybutene, polymethylstyrene, polyvinyl acetate, polyvinyl chloride, poly(acrylic acid esters), poly(methacrylic acid esters), polyacrylonitrile, polyesters such as poly(ethylene terephthalate), poly(butylene terephthalate), polyacrylates, polyurethanes, polyacetals, polycarbonates, polyphenylene ethers, polysulfones, polyether sulfones, polyarylsulfones, polyphenylene sulfide-sulfones, polyether-ketones, polyether-ether-ketones, polyphenylene sulfide ketones, polyimides, polyamide-imides, silicone resins, phenoxy resins, fluororesins, epoxy resins, their random, block, and graft copolymers and their mixtures.

If needed, also added are reinforcing fillers such as glass fibers, carbon fibers, ceramic fibers such as alumina fibers, aramid fibers, all-aromatic polyester fibers, metal fibers, potassium titanate whiskers, silicon carbide whiskers, etc., and inorganic fillers and organic and inorganic pigments, such as calcium carbonate, mica, talc, silica, barium sulfate, calcium sulfate, kaolin, clay, pyroferrite, bentonite, sericite, zeolite, nepheline syenite, attapulgite, wollastonite, ferrite, calcium silicate, magnesium carbonate, dolomite, antimony trioxide, zinc oxide, titanium oxide, magnesium oxide, iron oxide, molybdenum disulfide, graphite, gypsum, glass beads, glass powder, glass balloon, quartz, quartz glass, etc. The glass fibers are, e.g., chopped strands of length 1.5–12 mm and diameter 3–20 $\mu$, milled fibers of length 30–500 $\mu$ and diameter 3–20 $\mu$, and glass flakes and powders of less than 325 mesh.

Other additives may also be added if needed, including plasticizers such as aromatic hydroxy derivatives, etc., release agents, silane or titanate couplers, lubricants, heat stabilizers, weather stabilizers, nucleating agents, foaming agents, corrosion inhibitors, ion-trapping agents, fire retardants, fire-retardant aids, antioxidants, UV absorbers, sterically hindered amine light stabilizers, colorants, thiophosphonic acid metal salts as crosslinking accelerators for control of degree of crosslinking of polyphenylene sulfides, crosslinking inhibitors such as dialkyltin dicarboxylates, aminotrizoles, etc.

The polyphenylene sulfide compositions of the present invention can be prepared using the components described above. For example, hot melt kneading method may be used with uniaxial extruder, biaxial extruder, kneader, brabender, etc., while using the biaxial extruder is most preferred. In this case, there are no particular restrictions on kneading temperature, while it is chosen as preferred at 280°–400° C.

The resin compositions thus obtained in the present invention may be molded by various means into printed circuit board substrates, electronic part potting materials, various connector parts, heat-resistant coatings, thin moldings, fibers, sheets, films, tubes, etc., by various processing methods including injection molding, extrusion molding, foam molding, etc. Specific applications areas include automobiles, electric, electronic, mechanical industrial areas, where they can be used widely as molding materials having excellent heat resistance, fire resistance, moldability, and impact resistance.

The potting for electronic parts is used for sealing with such resin compositions for mechanical protection, electrical insulation, shielding from external environment for performance retention of electronic parts, e.g., IC, transistors, diodes, coils, condensers, resistors, varisters, connectors, various sensors, transformers, switches, etc. When used for such electronic part potting, the polyphenylene sulfide resin compositions of the present invention have melt viscosities (at 320° C.) below 1500 P, preferably below 1,200 P.

Effects of the invention

The polyphenylene sulfide resin compositions of the present invention have excellent heat resistance, fire resistance, moldability, and impact resistance. Thus, they are useful not only for large moldings, but also for materials providing toughness, even in electronic part potting that requires high flowability.

EXAMPLES

The present invention is explained in detail with examples. However, the present invention is not limited to the examples.

For the polyphenylene sulfides prepared in the reference examples, melt viscosity was measured using a Koka flow tester (die: $\phi=0.5$ mm, L=2 mm) at 300° C. under a load of 10 kg.

The analysis of the amino group introduced into polyphenylene sulfide is done by determination of the unreacted amino group-containing aromatic halogen compounds and aromatic nitro compounds left in the reaction mixture by gas chromatography.

Reference Example 1

Polyphenylene sulfide

In a 530-L reactor fitted with a stirrer, dehydration tower and a jacket were placed 110 L of N-methylpyrrolidone (NMP) and 61.1 kg of sodium sulfide (purity: $Na_2S$ 60.2 wt %). Under stirring, using a jacket, temperature was raised to 200° C., during which 13.5 L of mainly water was distilled off. Next, 68.7 kg of p-dichlorobenzene and 48 L of N-methylpyrrolidone were added, and the contents were heated over a period of 2 h to 225° C., then at 225° C. for 2 h, to 250° C. over a period of 30 min then at 250° C. for 3 h.

After the reaction, the reaction mixture was transferred into a solvent recovery vessel equipped with a stirrer, jacket, and vacuum line. At this time, 30 L of N-methylpyrrolidone were added, followed by heating in vacuo with removal of 210 L of distillate of mainly N-methylpyrrolidone.

Next, 200 L of water were added, and the aqueous slurry was stirred at 80° C. for 15 min and centrifuged to recover polymer.

The polymer was then returned to the solvent recovery vessel, treated with 200 L of water, stirred at 100° C. for 30 min, cooled, and centrifuged to recover polymer powder.

This procedure was repeated twice.

The polymer obtained was dried in a ribbon blender equipped with a jacket. The polyphenylene sulfide thus obtained was introduced into a 150-L ribbon blender and cured by stirring in air at 250° C. for 10 h. At the end of curing, the melt viscosity was 8000 P. The polyphenylene sulfide obtained was called PPS.

Reference Example 2

Amino group-containing polyphenylene sulfide

Reference Example 1 was repeated using 68.0 kg of p-dichlorobenzene and 0.684 kg of 3,5-dichloroaniline in place of 68.7 kg of p-dichlorobenzene of Reference Example 1 to obtain polyphenylene sulfide PPSI.

The polymer obtained had a melt viscosity of 9,200 P and amino group content of 0.9 mol %.

Reference Example 3

Amino group-containing polyphenylene sulfide

Reference Example 1 was repeated using 68.0 kg of p-dichlorobenzene and 0.684 kg of 5-chloro-1,3-phenylenediamine in place of 68.7 kg of p-dichlorobenzene of Reference Example 1 to obtain polyphenylene sulfide PPSII.

The polymer obtained had a melt viscosity of 8,700 P and amino group content of 0.5 mol %.

Reference Example 4

Hydrogenated block copolymer

As a hydrogenated block copolymer, hydrogenated styrene-butadiene-styrene triblock copolymer (Tuftek H1041, product of Asahi Kasei Co.) was used. This was called SEBS.

Reference Example 5

Carboxy group-containing hydrogenated block copolymer

As a carboxy group-containing block copolymer, maleic acid-modified hydrogenated styrene-butadiene-styrene triblock copolymer (Tuftek M1913, product of Asahi Kasei Co.) was used. This was called SEBS-AN.

Reference Example 6

Epoxy group-containing hydrogenated block copolymer

A uniform dry blend was prepared from 100 parts by weight of the hydrogenated block copolymer, hydrogenated styrene-butadiene-styrene triblock copolymer (Tuftek H1041, product of Asahi Kasei Co.), 5 parts by weight of glycidyl methacrylate, and 0.3 part by weight of Perhexa 25B (product of Nippon Yushi Co.) and subjected to modification reaction with forced vent in a 40 mm$\phi$ vented biaxial extruder at 180° C., connected to a vacuum pump (vacuum: 750 mm Hg-gauge). The epoxy group-containing hydrogenated block copolymer was treated with refluxing acetone for 20 h in a Soxhlet extractor and analyzed for epoxy value, showing the grafted glycidyl methacrylate content was 1.8 wt %. This polymer was called SEBS-GMA.

Reference Example 7

Nylon 66

The nylon 66 used was Amilan CM3001-N (product of Toray Co.) This was called PA66.

Reference Example 8

Nylon 46

The nylon 46 used was Unitika Nylon 46 Resin F5000 (product of Unitika Co.) This was called PA46.

Application Examples 1–3, Comparative Examples 1–5

Dry blends were prepared from polyphenylene sulfide prepared in Reference Examples 1–3, polyamides (nylons) of Reference Examples 4–5, and hydrogenated block copolymers obtained in Reference Examples 6–8 in accordance with Table I. The blends were then melt-kneaded in biaxial extruder rotating in the same direction at 290°–360° C. at screw speed 200 rpm, and the extruded strand was pelletized.

The pellets thus obtained were fed into a screw inline injection molding machine at 290°–360° C. and molded at die temperature 135° C. into test pieces for Izod impact test. These test pieces were then subjected to tensile test (ASTM D-638), high-load (18.56 kg/cm$^2$) heat distortion temperature (ASTM D-648), and Izod (notched) impact strength (ASTM D-256, 23° C.). Results are given in Table I.

TABLE I

|  |  |  | 実施例 1 | 実施例 2 | 実施例 3 | 比較例 1 | 比較例 2 | 比較例 3 | 比較例 4 | 比較例 5 |
|---|---|---|---|---|---|---|---|---|---|---|
| 組成 | (a)* | PPSI | 55 |  |  |  |  |  |  |  |
|  |  | PPSII |  | 60 | 85 |  |  |  |  |  |
|  |  | PPS |  |  |  | 55 | 60 | 85 | 55 | 100 |
|  | (b)* | SEBS |  | 40 |  |  | 40 | 15 | 45 |  |
|  |  | SEBS-AN | 45 |  |  | 45 |  |  |  |  |
|  |  | SEBS-GMA |  |  | 15 |  |  |  |  |  |
|  | (c)* | PA46 |  | 40 | 40 |  |  |  |  |  |
|  |  | PA66 | 10 |  |  | 10 | 40 | 40 |  | 30 |
| 評価 | アイゾット衝撃値 (ノッチ付kgf・cm/cm) |  | 12 | 10 | 5 | 3 | 3 | 2 | 4 | 2 |
|  | 熱変形温度 (18.56 kg/cm³, °C.) |  | 108 | 110 | 120 | 95 | 97 | 100 | 98 | 100 |

*(a) and (b) wt %; (c) in parts by weight based on 100 parts by weight of (a) + (b)
Key:
1 Application example
2 Comparative example
3 Composition
4 Evaluation
5 Izod impact strength (notched, kg – cm/cm)
6 Heat-distortion temperature The results show that the 2-component resin composition of Comparative Example 4 has some improvement in impact strength, but heat resistance is sacrificed. The 2-component resin composition of Comparative Example 5 has poor compatibility with unsatisfactory impact strength. Even in the 3-component resin compositions of Comparative Examples 1, 2 and 3, the compatibility between polyphenylene sulfide and polyamide is poor with unsatisfactory impact strength. On the other hand, in the resin compositions of the application examples, the amino group introduction improved the compatibility between polyphenylene sulfide and polyamide, resulting in good impact strength without sacrificing heat resistance. This may be ascribed to the surprising impact strength enhancement as a result of synergetic effects of the three-component interaction by introduction of amino group into polyphenylene sulfide.

We claim:
1. A thermoplastic composition, comprising:
   (a) an amino group-containing polyphenylene sulfide;
   (b) a hydrogenated block copolymer containing at least one vinyl aromatic compound polymer block, and at least one hydrogenated conjugated diene compound polymer block; and
   (c) polyamide resin;
   wherein the weight ratio of component (a) to component (b) is in the range of 99–50:1–50; and wherein the weight ratio of (a+b):c is in the range of 100:1–63.
2. The composition of claim 1, wherein component (a) is prepared by the reaction of at least one halogen-substituted aromatic compound with an alkali metal sulfide.
3. The composition of claim 1, wherein component (a) is prepared by the polymerization of an alkali metal sulfide and a dihalobenzene in an organic amide solvent, in the presence of an amino group-containing material which is
   (A) an aromatic halogen compound of the formula

$$(X)_m Ar(NH_2)_n$$

in which X is a halogen; Ar is an aromatic hydrocarbon group of 6–18 carbon atoms; m is an integer of 1–4; and n is an integer of 1–4;
or
   (B) a nitrogen group-containing aromatic compound of the formula $$(NH_2)_x Ar(NO_2)_y$$

in which Ar is an aromatic hydrocarbon group of 6–18 carbon atoms; x is an integer of 0–4; and y is an integer of 1–4; and when x=0, y represents an integer of 2–4.
4. The composition of claim 3, wherein the aromatic halogen compound is selected from the group consisting of m-fluoroaniline, o-chloroaniline, m-chloroaniline, p-chloroaniline, 5-chloro-1,3-phenylenediamine; 3,5-dichloroaniline; and mixtures of any of the foregoing.
5. The composition of claim 3, wherein the nitrogen group-containing aromatic compound (B) is selected from the group consisting of o-dinitrobenzene, m-dinitrobenzene, p-dinitrobenzene; 1,2,3-trinitrobenzene; nitroaniline; 3-nitro-2-aminotoluene; 3-nitro-o-phenylenediamine; 1-amino-2-nitronaphthalene; 1-amino-2,4-dinitronaphthalene; 9,10-dinitroanthracene; and mixtures of any of the foregoing.
6. The composition of claim 3, wherein the dihalobenzene is selected from the group consisting of p-dichlorobenzene, p-dibromobenzene, p-diiodobenzene, m-dichlorobenzene, m-dibromobenzene, m-diiodobenzene; and 1-chloro-4-bromobenzene.
7. The composition of claim 3, wherein the amino group content in component (a) is in the range of 0.01–20 mole percent.
8. The composition of claim 7, wherein the amino group content is in the range of 0.05–5 mole percent.
9. The composition of claim 1, wherein component (b) is derived from a non-hydrogenated block copolymer having a structure selected from the group consisting of A-B; A-B-A; B-A-B-A; A-B-A-B-A; and (A-B)$_4$-Si; wherein "A" is a vinyl aromatic compound polymer block, and "B" is a conjugated diene compound polymer block.
10. The composition of claim 9, wherein the block copolymer is either random or tapered.
11. The composition of claim 9, wherein the vinyl aromatic compound is selected from the group consisting of styrene, p-methylstyrene, vinyl toluene, 4-t-butylstyrene; 1,1-diphenylethylene; and mixtures of any of the foregoing.
12. The composition of claim 9, wherein the conjugated diene compound is selected from the group consisting of butadiene, isoprene; 1,3-pentadiene; 2,3-dimethyl-1,3-butadiene; and mixtures of any of the foregoing.

13. The composition of claim 1, wherein the polyamide of component (c) is:

(A) obtained by the ring-opening polymerization of a lactam compound;

(B) is derived from an amino acid; or (C) is derived from an aliphatic, alicyclic, or aromatic diamine.

14. The composition of claim 1, wherein the polyamide is selected from the group consisting of Nylon 6, Nylon 11, Nylon 12, Nylon 6,6; Nylon 4,6; and copolymers of any of the foregoing.

15. The composition of claim 1, comprising:

99–50 weight percent of component (a);

1–50 weight percent of component (b); and

1–63 weight percent of component (c);

based on the combined weights of components (a), (b), and (c).

16. The composition of claim 15, comprising:

90–50 weight percent of component (a);

10–50 weight percent of component (b); and

5–60 weight percent of component (c).

17. An improved composition, comprising:

(a) about 50% by weight to about 90% by weight of an amino group-containing containing polyphenylene sulfide;

(b) about 29% by weight to about 50% by weight of a hydrogenated block copolymer containing at least one vinyl aromatic compound polymer block and at least one hydrogenated conjugated diene compound polymer block; and (c) about 1% by weight to about 29% by weight of at least one polyamide resin; based on the combined weights of components (a), (b), and (c).

* * * * *